No. 757,961. PATENTED APR. 19, 1904.
C. F. RANDALL & W. C. VANNEMAN.
BRICK MACHINE.
APPLICATION FILED AUG. 7, 1903.
NO MODEL. 2 SHEETS—SHEET 1.

Witnesses
Olive B. Kaiser
Luise Beck

Inventors
Clinton F. Randall
William C. Vanneman
By Wood & Wood
Attorneys

No. 757,961. PATENTED APR. 19, 1904.
C. F. RANDALL & W. C. VANNEMAN.
BRICK MACHINE.
APPLICATION FILED AUG. 7, 1903.
NO MODEL.
2 SHEETS—SHEET 2.
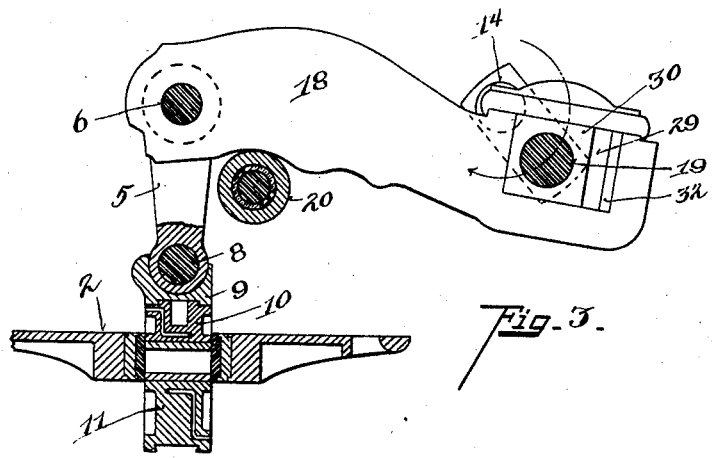
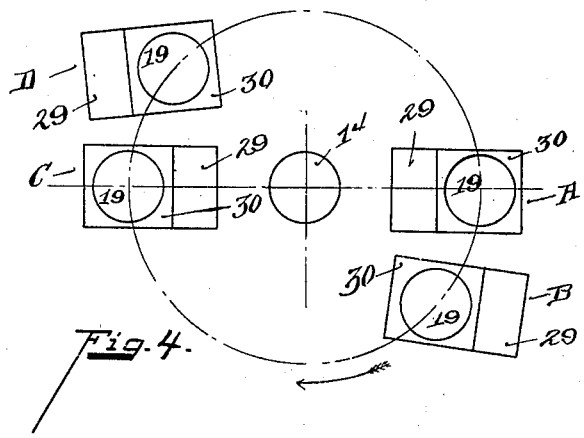

No. 757,961. Patented April 19, 1904.

UNITED STATES PATENT OFFICE.

CLINTON F. RANDALL AND WILLIAM C. VANNEMAN, OF ANDERSON, INDIANA, ASSIGNORS TO THE ANDERSON FOUNDRY & MACHINE WORKS, OF ANDERSON, INDIANA, A CORPORATION.

BRICK-MACHINE.

SPECIFICATION forming part of Letters Patent No. 757,961, dated April 19, 1904.

Application filed August 7, 1903. Serial No. 168,565. (No model.)

*To all whom it may concern:*

Be it known that we, CLINTON F. RANDALL and WILLIAM C. VANNEMAN, citizens of the United States, residing at Anderson, in the county of Madison and State of Indiana, have invented certain new and useful Improvements in Brick-Machines, of which the following is a specification.

Our invention relates to an improvement in a dry-press-brick machine, the object being to improve the quality and density of the brick.

Our invention is shown as applied to a machine of the type illustrated and described in Patent No. 598,554, granted Anton Berg February 8, 1898, although the said invention is capable of application to any of the familiar forms of pitman-machines.

The features of the invention are more fully set forth in the description of the accompanying drawings, in which—

Figure 1:
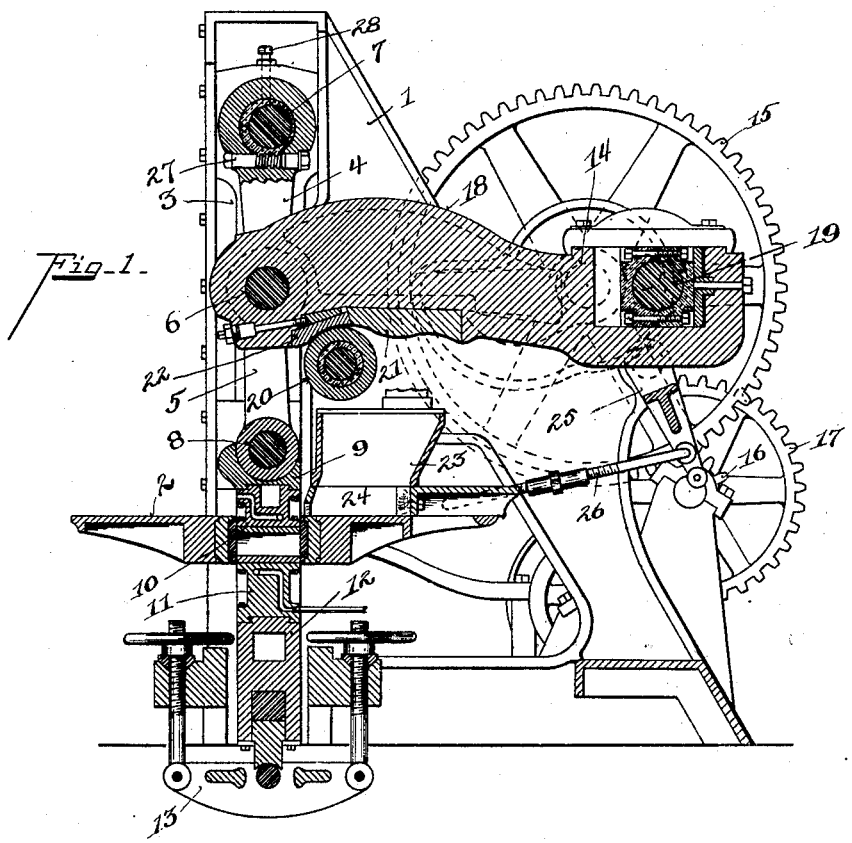
Figure 2:
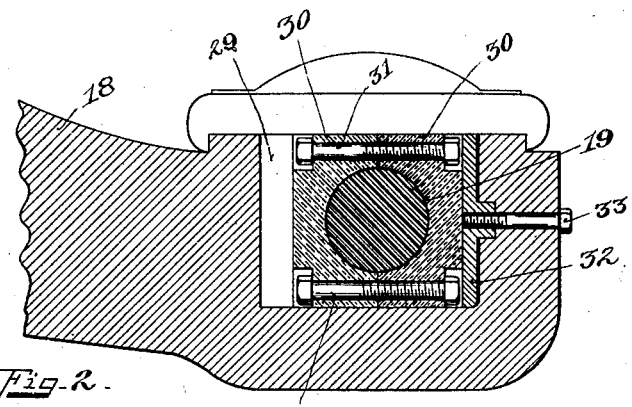

Figure 1 is a central vertical section of the improvement. Fig. 2 is a detail sectional view of the pitman and crank-pin connection.
Fig. 3 is a detail sectional view of a portion of the pressing mechanism in lifting-out position. Fig. 4 is a diagrammatic illustration of the crank-pin and piston-box connection in different positions.

1 represents the frame of the machine; 2, the mold-table, having the usual molds. The sides of the frame are provided with vertical guides, in which slide the connecting side bars 3.

4 5 represent toggle-arms, pivoted together by central toggle-pin 6, toggle-arm 4 being pivoted by toggle-pin 7 at its upper end to the top of the side bars 3. Toggle-arm 5 is pivoted at its lower end by means of the pin 8 to the upper cross-head 9, carrying the upper plungers 10.

11 represents the lower plungers, carried by the lower cross-head 12, which is supported on the lower ends of the side bars 3.

13 represents the cradle mechanism, on which the toggles, plungers, and side bars are supported and by which they are vertically adjusted relative to the mold-table.

14 represents the crank-shaft, on the end of which is a gear-wheel 15, in train with the gear-wheels 16 and 17 for rotating the crank-shaft.

18 represents the pitman-lever, one end of which is connected to the central toggle-pin 6, the other end to the crank-shaft pin 19.

20 represents the fulcrum-roll, journaled in the frame of the machine, upon which the cam 21 of the pitman 18 slides and turns.

22 represents an adjustable cam-shoe in the front portion of the pitman-lever 18.

23 represents the hopper; 24, the feed-box; 25, the rocking arm for oscillating the feed-box, and 26 the connecting-rod between the feed-box and the rocking arms.

27 28 represent adjusting-bolts engaging the top toggle-pin 7 for taking up lost motion.

So far the machine corresponds in structure and organization with the brick-press shown and described in the Berg patent. Our machine follows also the same general plan of operation both in pressing the brick, lifting out, pushing forward the brick for delivery, and charging the molds. There is, however, this important difference in the pressing operation. In our device when the toggles have all their joints in alinement, that being the moment of greatest pressure, means are provided for temporarily suspending the transmission of power from the crank-shaft to the central toggle-pin, which results in prolonging the interval of greatest compression. In other words, when the upper and lower plungers have arrived at their closest proximity, necessarily the time of the greatest compression, they are caused to dwell in said position upon the clay in the molds without flexation of the toggles. This allows time for the escape of all gases, enables more clay to be compressed in a brick of given dimensions than would be possible without this dwell, and gives a higher finish to the brick by reason of a greater duration of movement of clay in the molds during maximum compression, and hence increased polishing action of the sides of the molds. There are a number of mechanical means for effecting this result, and we have only shown what we consider the preferred form, of which the following are the details: The crank end of the pitman-lever 18 is provided with a slide-box 29. The crank-pin 19 journals in a sliding bearing-boss 30, which fits and slides within the pitman-box 29. This boss 30 is preferably composed of split bushings held together by the clamping-bolts 31, as shown in Fig. 2.

32 represents a compensating plate in the box 29, adjustable therein by means of the bolt 33, engaging through the heel of the pitman. Obviously the position of the plate 32 controls the amount of slide-room of the crank-pin and boss in the pitman slide-box 29.

The machine is constructed so that when the toggle-joints 6, 7, and 8 are in straight vertical line (the position of greatest compression) the middle toggle-joint 6, the crank-shaft 14, and the crank-pin 19 will be in a horizontal straight line with the sliding boss 30, engaging against the plate 32 (see Figs. 1 and 2) at the rear of the box 29. The object of this arrangement is to prevent the toggles from flexing to the rear of a vertical straight line, so that by causing the parts to dwell in this position the interval of compression may be prolonged.

In Fig. 1 the toggles are straight, and full compression has been obtained. When the crank-pin moves downward, as indicated by arrows, (see Figs. 3 and 4,) the pin 19 and boss 30 begin to move forward toward the front shoulder of the pitman slide-box 29. As the toggles cannot be flexed forward of the said straight line until the boss 30 has traveled into contact with the front side of the slide-box 29, obviously the plungers remain in position of maximum compression during this interval. The pitman in the horizontal position (shown in Fig. 1) is a lever fulcrumed on the roll 20 between its ends. As the crank in its continued rotation carries down the rear end of the pitman-lever the front end will necessarily rise. However, the slotted connection between the pitman-lever and the crank-pin while permitting the front end of the lever to rise prevents the pitman from moving forward and imparting a flexing strain to the toggles until the sliding boss engages the shoulder 29 of the pitman. In other words, the result of this slotted connection is that at the moment of greatest compression the element 18 is simply a lever, lifting the entire toggle system bodily, while the toggles remain straight and while the plungers remain at the greatest compression. The result of this coöperation is that not only is the interval of greatest compression prolonged, allowing the escape of gases, but that during this interval the brick is raised in the mold, greatly increasing the polishing action. The friction between the brick and the sides of the mold is greatest at the moment of greatest compression, and this maximum friction is overcome while the brick remains under full compressing influence of the plungers. This coöperation produces a brick of maximum density and polish. We have attempted to illustrate this movement in Fig. 4, in which A represents the completion of the greatest compression, from A to B the interval of prolonging of the greatest compression. At A the boss 30 engages the rear side of the pitman-box and the space is in front of the boss. In position B the boss 30 has moved forward into contact with the front side of the box 29 and the space in said box is to the rear of the boss. Therefore during the movement of the crank-pin and rear end of the pitman-lever from A to B the transmission of forward flexing strain to the central toggle-pin is suspended. From B to C the toggles flex forward, the brick being ejected, delivered, and the molds charged. When the central toggle-pins have reached their full forward stroke, (represented in position C,) the boss 30 begins its rearward slide in the box 29 until it again engages the rear side of said box, as illustrated in position D, at which point the initial pressure is exerted on the clay in the molds. These positions are not necessarily correct mathematically, being only intended as a relative diagram. This prolonging of the interval of closest proximity of the plungers in the molds is of great practical importance, as it enables a maximum quantity of clay to be effectively compressed into a minimum dimension of brick without bursting or checking the brick when discharged from the mold, as they have been held under pressure a sufficient length of time to allow all gases and air to escape. (It is the expansive qualities of the air contained in the brick that causes them to burst.) In fact, the results obtained from this press are equal to the best results obtained from a hydraulic press, without the inherent disadvantages possessed by the later type of brick-press.

Having described our invention, we claim—

1. In a brick-machine, a frame, the combination therewith of the molds, upper and lower plungers, toggles, side bars, crank-shaft, a fulcrum-roller journaled in the frame, a pitman-lever connecting the central toggle-joint to the crank-shaft and adapted to be influenced by said fulcrum-roll, and a slotted connection formed between the said pitman-lever end and the crank-pin, whereby at the moment of greatest compression the toggle flexation is suspended and the toggle system raised bodily, substantially as described.

2. In a brick-machine, a frame, the combination therewith of the molds, upper and lower plungers, toggles, side bars, crank-shaft, a fulcrum-roller journaled in the frame, a pitman-lever connecting the central toggle-joint to the crank-shaft and adapted to be influenced by said fulcrum-roll, one end of said pitman-lever having a sliding engagement with its connection, whereby at the moment of greatest compression the flexation of the toggles is suspended prolonging the interval of greatest compression, and the toggle system bodily raised during such interval, substantially as described.

3. In a brick-machine, a frame, the combination therewith of the molds, upper and lower plungers, toggles, side bars, crank-shaft, a fulcrum-roller journaled in the frame, a pitman-lever connecting the central toggle-joint to the crank-shaft and adapted to be influenced by said fulcrum-roll, the rear end of said pitman-lever having a slide-box formed therein, a sliding boss in said box, the crank-pin being journaled in said boss and an adjusting-plate in said slide-box, whereby at the moment of greatest compression the flexation of the toggles is suspended prolonging the interval of greatest compression, and the toggle system bodily raised during such interval, substantially as described.

In testimony whereof we have hereunto set our hands.

CLINTON F. RANDALL.
    WILLIAM C. VANNEMAN.

Witnesses:
 WILLIAM N. DURBIN,
 BYRON JARVIS.